(12) United States Patent
Chen

(10) Patent No.: US 12,197,594 B2
(45) Date of Patent: Jan. 14, 2025

(54) APPARATUS AND METHOD FOR DEFENDING AGAINST CONTROL FLOW ATTACK, AND PROCESSOR

(71) Applicant: Beijing ESWIN Computing Technology Co., Ltd., Beijing (CN)

(72) Inventor: Weijie Chen, Beijing (CN)

(73) Assignee: BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 197 days.

(21) Appl. No.: 18/080,296

(22) Filed: Dec. 13, 2022

(65) Prior Publication Data

US 2023/0195907 A1 Jun. 22, 2023

(30) Foreign Application Priority Data

Dec. 16, 2021 (CN) .......................... 202111561806.4

(51) Int. Cl.
  *G06F 21/52* (2013.01)
  *G06F 21/55* (2013.01)
  *G06F 21/60* (2013.01)

(52) U.S. Cl.
  CPC ............ *G06F 21/602* (2013.01); *G06F 21/55* (2013.01)

(58) Field of Classification Search
  CPC ........ G06F 21/602; G06F 21/55; G06F 21/60; G06F 21/50
  USPC ................................................... 713/190–191
  See application file for complete search history.

(56) References Cited

U.S. PATENT DOCUMENTS

| 9,875,378 | B2 * | 1/2018 | Benoit ................. G06F 21/79 |
| 10,984,096 | B2 * | 4/2021 | Yamada ............... G06F 21/52 |
| 11,704,404 | B2 * | 7/2023 | Meng .................. G06F 21/52 726/22 |
| 11,947,663 | B2 * | 4/2024 | Sethumadhavan ..... G06F 21/54 |

(Continued)

FOREIGN PATENT DOCUMENTS

| CN | 107590385 A | 1/2018 |
| CN | 110543766 A | 12/2019 |

(Continued)

OTHER PUBLICATIONS

Search Report dated Oct. 30, 2022 from the Office Action for Chinese Application No. 202111561806.4 Nov. 3, 2022, pp. 1-3.

*Primary Examiner* — Bharat Barot
(74) *Attorney, Agent, or Firm* — Ladas & Parry, LLP

(57) ABSTRACT

An apparatus for defending against control flow attack, including: a key acquisition module, configured to acquire response data, which is output by a physical unclonable function PUF module to an input stimulus, and store the response data in a register as key data to be used; an encryption module, configured to encrypt target execution data in a program control flow based on the key data in the process of the processor executing the program control flow, the target execution data including at least one of a target instruction at an indirect jump destination address and a function call return address; a decryption module, configured to decrypt the encrypted target execution data when the processor is to execute the target execution data; and an execution module, configured to continue to execute the program control flow based on the decrypted target execution data.

12 Claims, 6 Drawing Sheets

(56) References Cited

U.S. PATENT DOCUMENTS

| | | | | |
|---|---|---|---|---|
| 2016/0378522 A1* | 12/2016 | Kaplan | ................ | G06F 21/602 |
| | | | | 718/1 |
| 2021/0042415 A1* | 2/2021 | Wang | .................... | G06F 21/602 |
| 2021/0133314 A1* | 5/2021 | Wang | .................... | G06F 21/602 |

FOREIGN PATENT DOCUMENTS

| CN | 111030991 A | 4/2020 |
|---|---|---|
| CN | 112256357 A | 1/2021 |
| CN | 112332973 A | 2/2021 |
| CN | 113673002 A | 11/2021 |

\* cited by examiner

APPARATUS AND METHOD FOR DEFENDING AGAINST CONTROL FLOW ATTACK, AND PROCESSOR

CROSS-REFERENCE TO RELATED APPLICATION

This application claims priority from Chinese Patent Application No. 202111561806.4 filed on Dec. 16, 2021 in the China National Intellectual Property Administration, the content of which in its entirety is herein incorporated by reference.

TECHNICAL FIELD

The present application relates to the technical field of processors, and in particular to an apparatus and method for defending against control flow attack, a processor, a device and a storage medium.

BACKGROUND

Control flow attack is an attack method that seriously threatens the security of a computer system. The control flow attack alters control flow of programs to make the programs be executed according to an expectation by an attacker. The control flow attack has characteristics of hidden attack process, obvious attack effect and simple implementation. It has become an important factor that threatens the security of the computer system and a supplementary means to other attacks. Code injection attack is a widely studied attack method in which the attack is implemented by injecting a malicious code into a program stack and directing the program control flow into the program stack to make the malicious code be executed.

Existing defense methods generally cause relatively large performance loss or even cannot effectively defend against the control flow attack, such as the control flow attack based on the code injection attack. Therefore, there is an urgent need for a method for defending against the control flow attack, which may effectively defend against the attack on the program control flow.

SUMMARY

In one aspect, an apparatus for defending against control flow attack is provided, including: a key acquisition module, configured to acquire response data, which is output by a PUF (Physical Unclonable Function) module to an input stimulus, and store the response data in a register as key data to be used; an encryption module, configured to encrypt target execution data in a program control flow based on the key data in the process of the processor executing the program control flow, the target execution data including at least one of a target instruction at an indirect jump destination address and a function call return address; a decryption module, configured to decrypt the encrypted target execution data when the processor is to execute the target execution data; and an execution module, configured to continue to execute the program control flow based on the decrypted target execution data.

In a possible implementation, the target execution data is a function call return address.

Correspondingly, the encryption module is configured to, in the process of the processor executing the program control flow, read the key data from the register through a hardware engine when the program control flow includes a function call instruction; encrypt the function call return address based on the key data, and push the encrypted function call return address into a program stack.

Correspondingly, the decryption module is configured to fetch the encrypted function call return address from the program stack through the hardware engine when the execution of the called function by the function call instruction ends, and decrypt the fetched function call return address based on the key data.

In a possible implementation, the execution module is configured to send the decrypted function call return address to the register through the hardware engine; and control the program control flow to be jumped to the decrypted function call return address through the processor to continue to execute the program control flow.

In a possible implementation, the target execution data is a target instruction at an indirect jump destination address.

Correspondingly, the encryption module is configured to, in the process of the processor executing the program control flow, read the key data from the register through the hardware engine when the program control flow includes an indirect jump instruction; and in the process of loading the indirect jump instruction into the memory, encrypt the target instruction at the indirect jump destination address based on the key data through the hardware engine, and load the encrypted target instruction into the memory.

In a possible implementation, the encryption module is configured to perform the following encryption process on the target instruction through the hardware engine: in the process of loading the indirect jump instruction into the memory, encrypt the target instruction based on the key data and the encryption and decryption length obtained from the register.

Correspondingly, the decryption module is configured to perform the following decryption process on the encrypted target instruction through the hardware engine: decrypt the encrypted target instruction based on the same encryption and decryption length and the same key data as the encryption process.

In a possible implementation, the execution module is configured to send the decrypted target instruction to the register through the hardware engine, and execute the decrypted target instruction through the processor.

In a possible implementation, the key acquisition module is configured to acquire the response data, which is output by the PUF module to the input stimulus, when a memory security threshold of a target system does not exceed a target threshold, and store the response data in a first designated register as the key data to be used and store the encryption and decryption length in a second designated register; and when the memory security threshold of the target system exceeds the target threshold, obtain the key data based on an XOR encryption and decryption instruction sequence for protecting the key data, and store the key data in a third designated register.

In another aspect, a method for defending against control flow attack is provided, including: acquiring response data, which is output by a physical unclonable function PUF module to an input stimulus, and storing the response data in a register as key data to be used; encrypting target execution data in a program control flow based on the key data in the process of the processor executing the program control flow, the target execution data including at least one of a target instruction at an indirect jump destination address and a function call return address; decrypting the encrypted target execution data when the processor is to execute the target execution data; and continue to execute the program control flow based on the decrypted target execution data.

In a possible implementation, the target execution data is a function call return address.

Correspondingly, the encrypting the target execution data in the program control flow based on the key data in the process of the processor executing the program control flow includes: in the process of the processor executing the program control flow, reading the key data from the register through a hardware engine when the program control flow includes a function call instruction; encrypting the function call return address based on the key data, and pushing the encrypted function call return address into a program stack.

Correspondingly, the decrypting the encrypted target execution data when the processor is to execute the target execution data includes: fetching the encrypted function call return address from the program stack through the hardware engine when the execution of the called function by the function call instruction ends, and decrypting the fetched function call return address based on the key data.

In a possible implementation, the continuing to execute the program control flow based on the decrypted target execution data includes: sending the decrypted function call return address to the register through the hardware engine; and controlling the program control flow to be jumped to the decrypted function call return address through the processor to continue to execute the program control flow.

In a possible implementation, the target execution data is a target instruction at an indirect jump destination address.

Correspondingly, the encrypting the target execution data in the program control flow based on the key data in the process of the processor executing the program control flow includes: in the process of the processor executing the program control flow, reading the key data from the register through a hardware engine when the program control flow includes an indirect jump instruction; and in the process of loading the indirect jump instruction into the memory, encrypting the target instruction at the indirect jump destination address based on the key data through the hardware engine, and loading the encrypted target instruction into the memory.

In a possible implementation, the encrypting the target instruction at the indirect jump destination address based on the key data through the hardware engine includes: performing the following encryption process on the target instruction through the hardware engine: in the process of loading the indirect jump instruction into the memory, encrypting the target instruction based on the key data and the encryption and decryption length obtained from the register.

Correspondingly, the decrypting the encrypted target execution data includes: performing the following decryption process on the encrypted target instruction through the hardware engine: decrypting the encrypted target instruction based on the same encryption and decryption length and the same key data as the encryption process.

In a possible implementation, the continuing to execute the program control flow based on the decrypted target execution data includes: sending the decrypted target instruction to the register through the hardware engine, and executing the decrypted target instruction through the processor.

In a possible implementation, the acquiring the response data, which is output by the physical unclonable function PUF module to the input stimulus, and storing the response data in a register as the key data to be used include: acquiring the response data, which is output by the PUF module to the input stimulus, when a memory security threshold of a target system does not exceed a target threshold, and storing the response data in a first designated register as the key data to be used and storing the encryption and decryption length in a second designated register; and when the memory security threshold of the target system exceeds the target threshold, obtaining the key data based on an XOR encryption and decryption instruction sequence for protecting the key data, and storing the key data in a third designated register.

In another aspect, a processor is provided, including the apparatus for defending against control flow attack as described above.

In another aspect, a computer device is provided, including a memory, a processor, and a computer program stored on the memory, wherein the processor is to execute the computer program to implement the method for defending against control flow attack as described above.

In another aspect, a computer-readable storage medium is provided, having a computer program stored thereon that, when executed by a processor, implements the method for defending against control flow attack as described above.

In another aspect, a computer program product is provided, including a computer program that, when executed by a processor, implements the method for defending against control flow attack as described above.

BRIEF DESCRIPTION OF THE DRAWINGS

To describe the technical solutions of the embodiments of the present application more clearly, the drawings to be used in the description of the embodiments of the present application will be described briefly.

DETAILED DESCRIPTION

Embodiments of the present application will be described below with reference to the accompanying drawings in the present application. It should be understood that the embodiments to be described below with reference to the accompanying drawings are exemplary descriptions for explaining the technical solutions of the embodiments of the present application, and do not limit the technical solutions of the embodiments of the present application.

It may be understood by a person of ordinary skill in the art that singular forms "a", "an" and "the" used herein may include plural forms as well, unless otherwise stated. It should be further understood that the terms "comprise" and "include" used in the embodiments of the present application mean that corresponding features may be implemented as presented features, information, data, steps, operations, elements and/or components, but do not exclude implementations as other features, information, data, steps, operations, elements, components, and/or combinations thereof as supported in the art. It should be understood that, when an element is referred as being "connected to" or "coupled to" another element, this element may be directly connected or coupled to the other element, or this element and the other element may be connected through an intervening element. In addition, "connected to" or "coupled to" as used herein may include wireless connection or wireless coupling. The term "and/or" as used herein indicates at least one of the items defined by the term, e.g., "A and/or B" may be implemented as "A", or as "B", or as "A and B".

To make the purposes, technical solutions and advantages of the present application clearer, the implementations of the present application will be further described below in detail with reference to the accompanying drawings.

Figure 1:
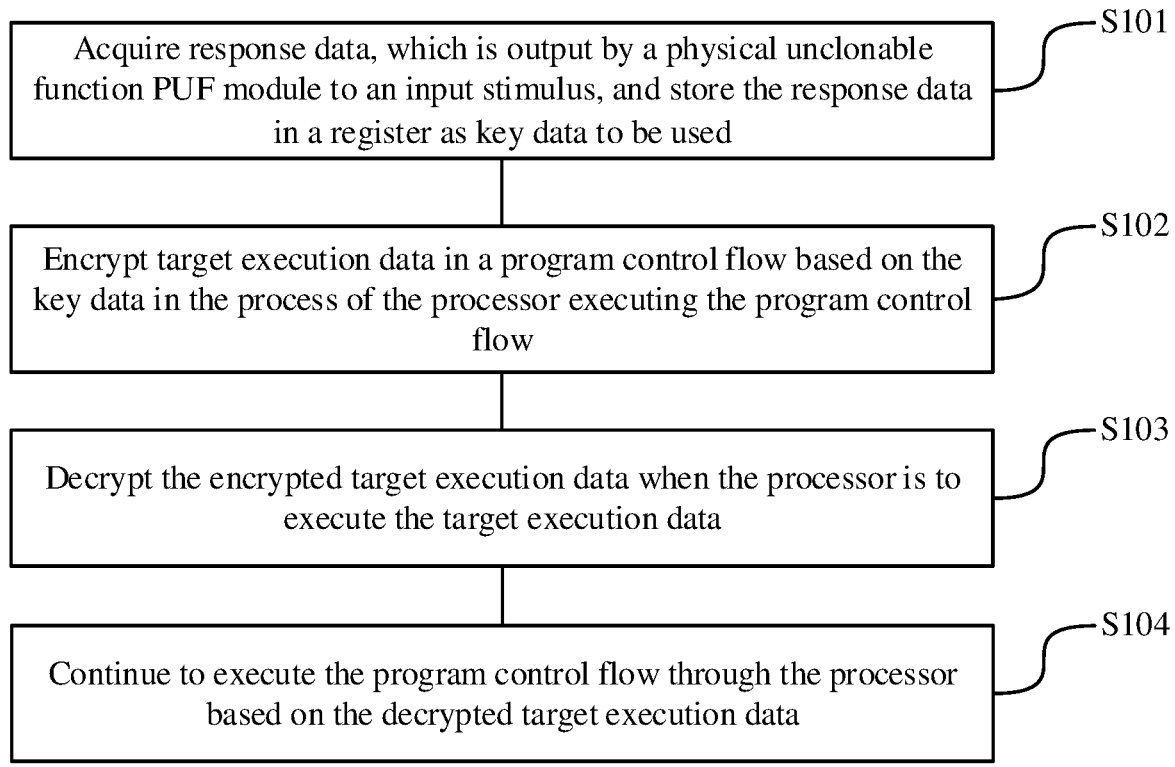
FIG. 1 is a schematic flowchart of a method for defending against control flow attack according to an embodiment of the present application.

FIG. 1 is a schematic flowchart of a method for defending against control flow attack according to an embodiment of the present application. The execution subject of the method may be an electronic device. As shown in FIG. 1, the method includes the following steps S101 to S104.

S101: Response data, which is output by a physical unclonable function (PUF) module to an input stimulus, is acquired and the response data is stored in a register as key data to be used. In this disclose, the PUF is also referred to as the PUF unit.

The PUF (Physical Unclonable Function) gives a unique response to each stimulus based on hardware characteristics, which may effectively overcome the problem that the response generated by the PUF module is not completely stable.

In a possible implementation, the PUF module may output response data based on the input stimulus, and in the present application, the response data may be acquired as key data. Exemplarily, according to the response data output by the PUF module, the response data is stored in a register KEY_CTRL_FLOW_INFO as key data, and the configured information on encryption and decryption length (hereinafter, the information on encryption and decryption length is also referred to as the encryption and decryption length) is stored in a register LEN_CTRL_FLOW_INFO. The encryption and decryption length refers to the length of the key data used for encryption and decryption, that is, only part of the response given by the PUF module is used as the key. For example, the key data may be 32-bit data, and the encryption and decryption length used during encryption and decryption may be 16 bits. That is, during encryption and decryption, 16-bit key data is selected from the 32-bit key data to encrypt and decrypt the target execution data (alternatively, referred to as target executed data).

In a possible implementation, when the memory of the target system is relatively safe, an XOR encryption instruction sequence for protecting the key is used to reduce performance loss. When the memory security threshold of the target system is low, an AES engine for protecting the key is used to prevent the key from leaking out. The numerical value of the memory security threshold may indicate the level of memory security, and the memory security threshold may be obtained from a register. Therefore, the process of S101 may include: acquiring response data, which is output by the PUF module to an input stimulus, when a memory security threshold of a target system does not exceed a target threshold, and storing the response data in a first designated register as the key data to be used and storing the encryption and decryption length in a second designated register; and when the memory security threshold of the target system exceeds the target threshold, obtaining the key data based on an XOR encryption and decryption instruction sequence for protecting the key, and storing the key data in a third designated register. The first designated register, the second designated register and the third designated register may be configured based on needs. For example, the first designated register may be the register KEY_CTRL_FLOW_INFO; and the second designated register may be the register LEN_CTRL_FLOW_INFO.

Exemplarily, before the program is loaded into the memory, the PUF module is used to generate key data, and the key data is stored in the registers KEY_CTRL_FLOW_INFO. Only part of the response given by the PUF module (hereinafter, also referred to as PUF) is used as the key, and the length of the key used is determined by the LEN_CTRL_FLOW_INFO. Although a random number or a trusted key provided by the manufacturer may also be used to replace the key generated by the PUF, the existing random number generator generally generates a pseudo-random number, and the security of the key is not as high as that generated by the PUF. When a trusted key provided by the processor manufacturer is used, the encryption and decryption keys are constant at any time. Although the key may be well protected, more trusted key information may be leaked to the attacker. The persistent and unpredictable, unclonable, and tamper-resistant properties of PUF are sufficient to ensure that it is difficult for an attacker to guess the key generated by the PUF of the attacked device.

Control flow attack is an attack method that seriously threatens the security of the computer system. Existing defense methods generally cause relatively large performance loss or even cannot effectively defend against the control flow attack based on an indirect jump instruction. Encryption and decryption is a widely used and very effective security method, but ensuring the security of the key is a very challenging problem. It is proposed in the present application to use PUF for encryption and decryption. Since PUF gives a unique response to each stimulus based on hardware characteristics, the PUF has a great advantage in generating the safe key. Due to the advantages of persistence and unpredictability, unclonability and tamper resistance, the PUF has been widely used in security applications including key generation, chip fingerprinting and random number seed generation. The present application combines the PUF and an encryption and decryption mechanism. Specifically, a computer device is configured with a PUF module which is used to acquire key data required for encryption and decryption. From the perspective of processor security, a method for defending against control flow attack with lower overhead is studied, thereby enhancing the security of a high-performance processor.

Figure 2:
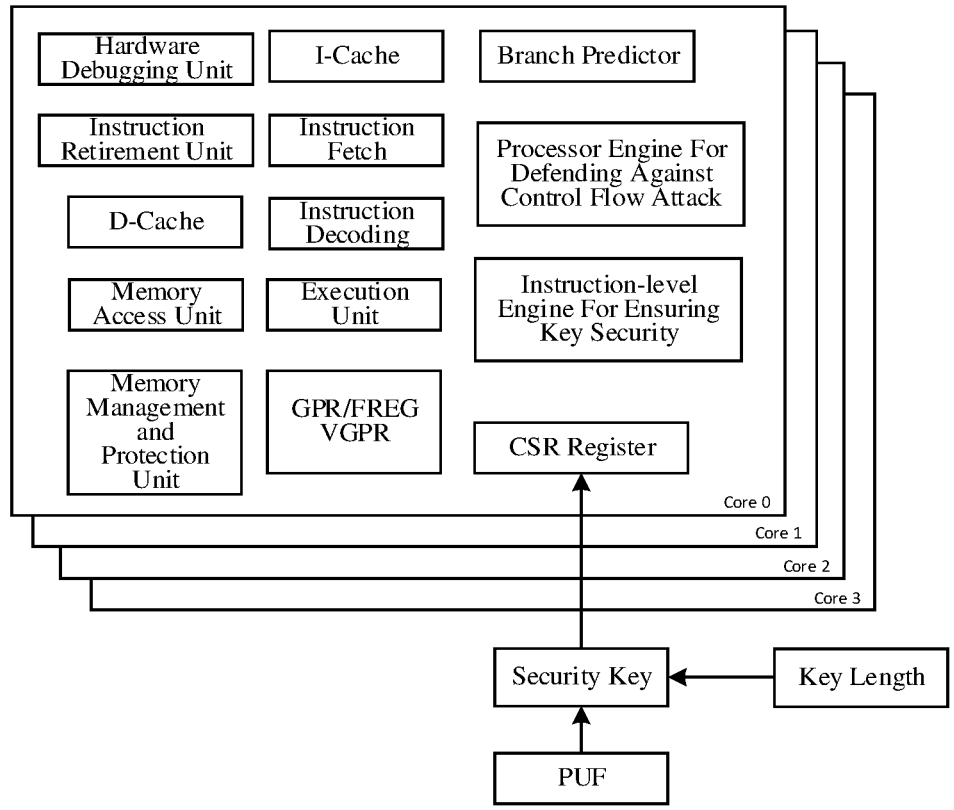
FIG. 2 is a schematic diagram of a processor encryption architecture according to an embodiment of the present application.

Specifically, the present application provides a processor encryption architecture. As shown in FIG. 2, a security key is acquired through PUF and stored in a CSR register, and the key length used for encryption and decryption, i.e., the encryption and decryption length, is configured. The processor encryption architecture includes critical components of a superscalar out-of-order high-performance core, such as instruction fetching unit, instruction decoder, high-precision hybrid branch predictor, first-level cache where instruction and data are separated, second-level cache, third-level cache, instruction fast retirement unit, multi-core hardware debugging support, execution unit support scalar and vector, virtual memory management unit support multi-level page table, and fine-grained physical memory protection unit. In addition, as shown in FIG. 2, the processor encryption architecture may further include: hardware debugging unit, I-cache, D-cache, memory access unit, memory management and protection unit, CSR register, instruction set engine for ensuring key security, processor engine for defending against control flow attack, GPR (General Purpose Register)/FREG (Fault Register)/VGPR (Vector General-Purpose Register), etc. In the present application, by configuring the processor with the encryption structure, through the configurable encryption and decryption length and key content, and by making full use of PUF to give a unique response to each stimulus based on hardware characteristics, thereby obtaining the advantages of persistence and unpredictability, unclonability and tamper resistance, a light-weight encrypted processor architecture is constructed to prevent the attacker from altering the program control flow by using function call process and indirect jump process.

S102: In the process of the processor executing the program control flow, the target execution data in the program control flow is encrypted based on the key data.

The target execution data includes at least one of the target instruction at the indirect jump destination address and the function call return address.

S103: The encrypted target execution data is decrypted when the processor is to execute the target execution data.

Control flow attacks, especially ROP (Return-oriented Programming) and JOP (Jump-oriented Programming), often use the function call process and indirect jump process to alter the program control flow. When the function call occurs, the function call return address will be pushed into the program stack. After the execution of the called function ends, the function call return address will be popped from the program stack, and the program control flow will be jumped to the function call return address, so that the program is continued to be executed. If the return address in the program stack is altered, the program control flow may be altered. In addition, the destination address of the indirect jump instruction is generally in the register. If the value of the register is altered, after the program executes the indirect jump instruction, the control flow will be jumped to other places to execute the program. Based on this, the present application proposes a method for protecting the function call return address and protecting the target instruction at the indirect jump destination address, respectively corresponding to the following examples.

In an example, the target execution data is a function call return address. For example, an instruction-level engine that ensures the key security encrypts the return address when the function call occurs, and decrypts it when the function call returns.

Figure 3:
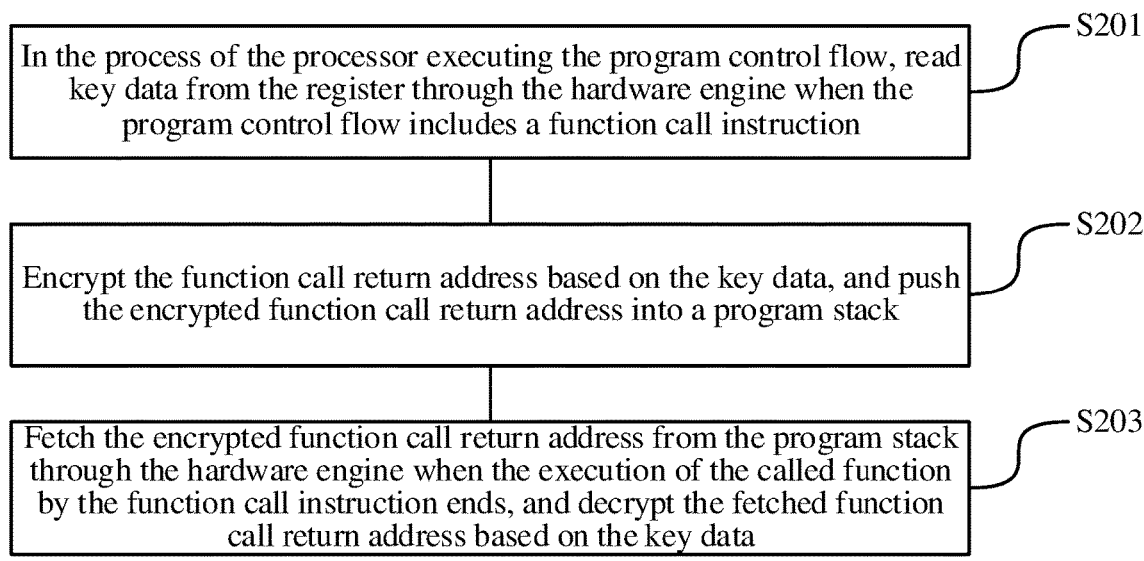
FIG. 3 is a flowchart of a method for protecting a function call return address according to an embodiment of the present application.

FIG. 3 is a flowchart of a method for protecting the function call return address according to the present application, so that the instruction-level engine that ensures key security encrypts the return address when the function call occurs. As shown in FIG. 3, the encryption and decryption process of the function call return address may include the following steps S201 to S203.

S201: In the process of the processor executing the program control flow, key data is read from the register through a hardware engine when the program control flow includes a function call instruction.

S202: The function call return address is encrypted based on the key data, and the encrypted function call return address is pushed into a program stack.

S203: The encrypted function call return address is fetched from the program stack through the hardware engine when the execution of the called function by the function call instruction ends, and the fetched function call return address is decrypted based on the key data.

For example, the key data may be 32-bit data, and the encryption and decryption length used in encryption and decryption may be 16 bits. That is, 16-bit key data may be read from the register KEY_CTRL_FLOW_INFO to encrypt the function call return address. During decryption, the same 16-bit key data may be used for decryption.

In order to protect the function call return address, when the function call occurs, the hardware engine SEC_ENG, which ensures the key security, encrypts the return address by using the encryption key generated by the PUF, and then puts the encrypted return address to the program stack; and when the called function returns after completion of its execution, the hardware engine SEC_ENG uses the same key to decrypt the return address fetched from the program stack, and then the execution flow of the program jumps to the decrypted return address. If the attacker alters the return address in the program stack, since the attacker does not know the encryption key, after the return address fetched from the program stack is decrypted, the return address is not the return address expected by the attacker. Thus, the attacker is effectively prevented from maliciously tampering with the program control flow by using the return address.

Figure 4:
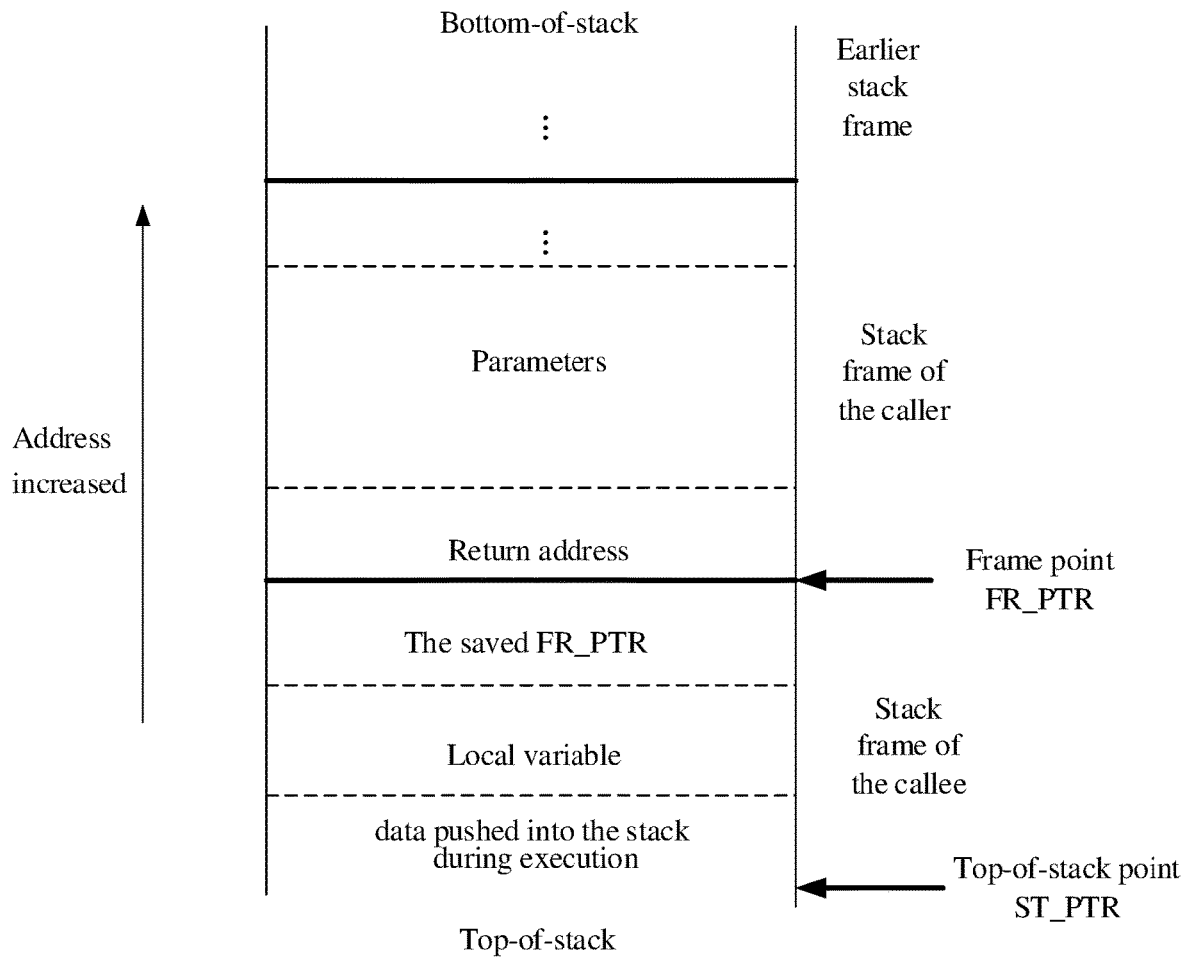
FIG. 4 is a schematic diagram of a program stack alteration when a function call occurs, according to an embodiment of the present application.

FIG. 4 shows the program stack alteration when a function call occurs. As shown in FIG. 4, the program stack may include an earlier stack frame, a stack frame of the caller, and a stack frame of the callee. The stack frame of the caller includes relevant parameters (parameter 1, . . . , parameter n) and a return address, and the return address is the function call return address. The stack frame of the callee has a frame pointer ST_PTR. The stack frame of the callee includes the saved FR_PTR, local variables, and data pushed into the stack during execution. The stack frame of the callee has a top-of-stack pointer ST_PTR. When a function call occurs, the function call parameters and return address will be pushed into the program stack, and then the execution flow of the program jumps to the called function to execute the called function. The called function will push the frame pointer of the caller into the stack and then alter the value of the top-of-stack pointer to provide space for local variables and execution-time data. When the function call returns, the frame pointer will be restored and the return address will be put to an IP register, and then the processor will continue program execution from the return address. If the return address is maliciously altered by the attacker, the program will be jumped to the popped return address to be executed. In this case, the control flow of the program is tampered with. If an attacker pushes multiple return addresses into the stack, each time a return instruction is executed, the program will be jumped to the altered return address, and the attacker may make the program behave as they expect. Thus, by simply altering the control flow of the program, the target program is attacked.

Figure 5:
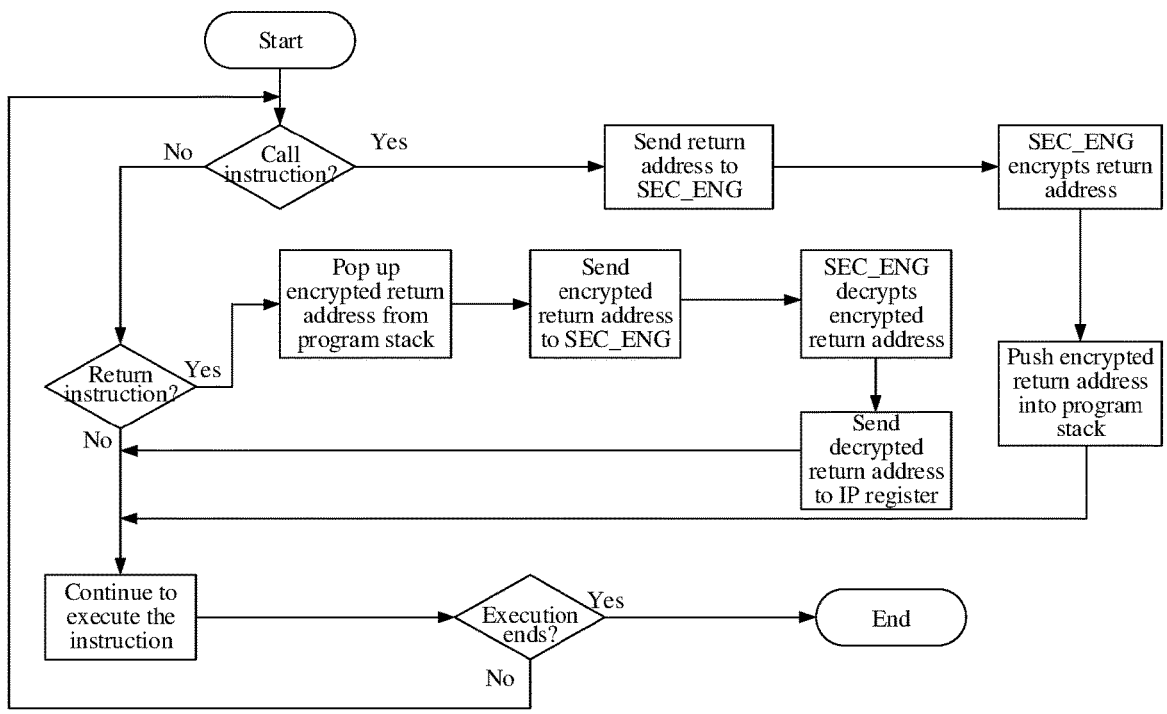
FIG. 5 is a flowchart of a method for protecting a function call return address according to an embodiment of the present application.

Exemplarily, the function call instruction may include a call instruction and a return instruction. The PUF module protects the function call process by encrypting and decrypting the function call return address. The workflow is shown in FIG. 5. When executing the call instruction, the processor sends the return address to the hardware engine SEC_ENG for encryption, and then pushes the return address encrypted by the SEC_ENG into the program stack; when executing the return instruction, the processor pops the encrypted return address from the program stack and sends it to the SEC_ENG for decryption, and then sends the return address decrypted by the SEC_ENG to the IP register, and makes the program control flow be jumped to this address to continue the program execution.

It should be noted that, if the attacker alters the return address in the program stack, when the function returns, the SEC_ENG will also decrypt the fetched return address. Since the attacker does not know the encryption key, the return address obtained by decryption is not the return address expected by the attacker, the attacker is prevented from tampering with the control flow based on the function call process. In addition, the decrypted fault return address may be an illegal memory space. When a program tries to access an illegal or unauthorized memory space, a segmentation fault will be triggered. The operating system will catch the segmentation fault and handle the fault, so as to detect the attack on the control flow based on the function call process.

In another example, the target execution data is a target instruction at the destination address of the indirect jump. For example, when the program is loaded into memory, the instruction-level engine that ensures the key security encrypts the target instruction at the indirect jump destination address, and decrypts the instruction at the destination address when the indirect jump instruction is executed.

Figure 6:
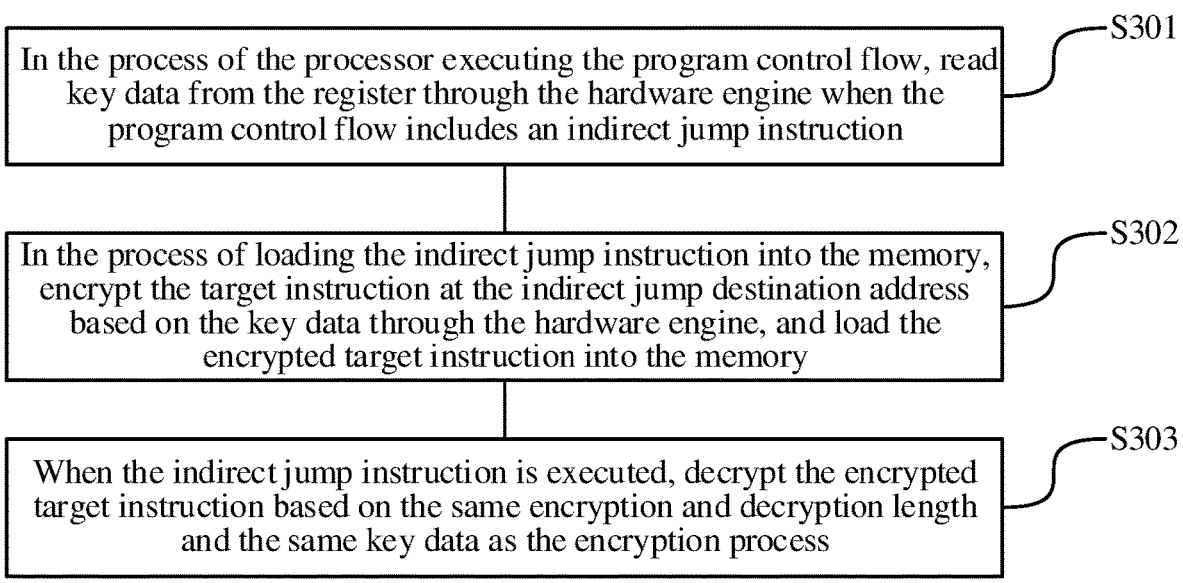
FIG. 6 is a flowchart of a method for protecting an indirect jump destination address according to an embodiment of the present application.

FIG. 6 is a flowchart of a method for protecting the indirect jump destination address according to the present application, so that the instruction-level engine that ensures the key security encrypts the return address when the function call occurs. As shown in FIG. 6, the encryption and decryption process of the function call return address may include the following steps S301 to S303.

S301: In the process of the processor executing the program control flow, key data is read from the register through a hardware engine when the program control flow includes an indirect jump instruction.

S302: In the process of loading the indirect jump instruction into the memory, the target instruction at the indirect jump destination address is encrypted based on the key data through the hardware engine, and the encrypted target instruction is loaded into the memory.

In a possible implementation, the process of encrypting the target instruction by the hardware engine may include: in the process of loading the indirect jump instruction into the memory, encrypting the target instruction based on the key data and the encryption and decryption length obtained from the register.

S303: When the indirect jump instruction is executed, the encrypted target instruction is decrypted based on the same encryption and decryption length and same key data as the encryption process.

For example, the key data may be 32-bit data, and the encryption and decryption length used in encryption and decryption may be 16 bits. That is, 16-bit key data may be read from the register KEY_CTRL_FLOW_INFO to encrypt the target instruction at the indirection jump destination address. During decryption, the same 16-bit key data may be used to decrypt the target instruction at the indirect jump destination address.

It should be noted that, in order to defend against control flow attack based on an indirect jump instruction, when the program is loaded into memory, the PUF encrypts the target instruction at the indirect jump instruction destination address, and then puts the encrypted instruction to the corresponding memory address; and when the indirect jump instruction is executed, the SEC_ENG decrypts the target instruction at the destination address, and then executes the decrypted instruction. Since the target instruction at the control flow expected by the attacker is not encrypted when the program is loaded, after the indirect jump instruction is executed, the decrypted instruction executed by the processor is not the instruction expected by the attacker. Thus, the attacker is prevented from altering the program control flow by using the indirect jump instruction.

It should be noted that, in the classical processor design, when a program needs to be executed, the processor will load the data and codes of the program into the corresponding memory address. When the indirect jump instruction is executed, the processor will send the target instruction at the destination address to the instruction register and execute the instruction from the destination address. If the attacker alters the destination address of the indirect jump instruction, the content in the instruction register will not be the instruction data that the normal control flow should have, and the attacker may mislead the control flow.

Figure 7:
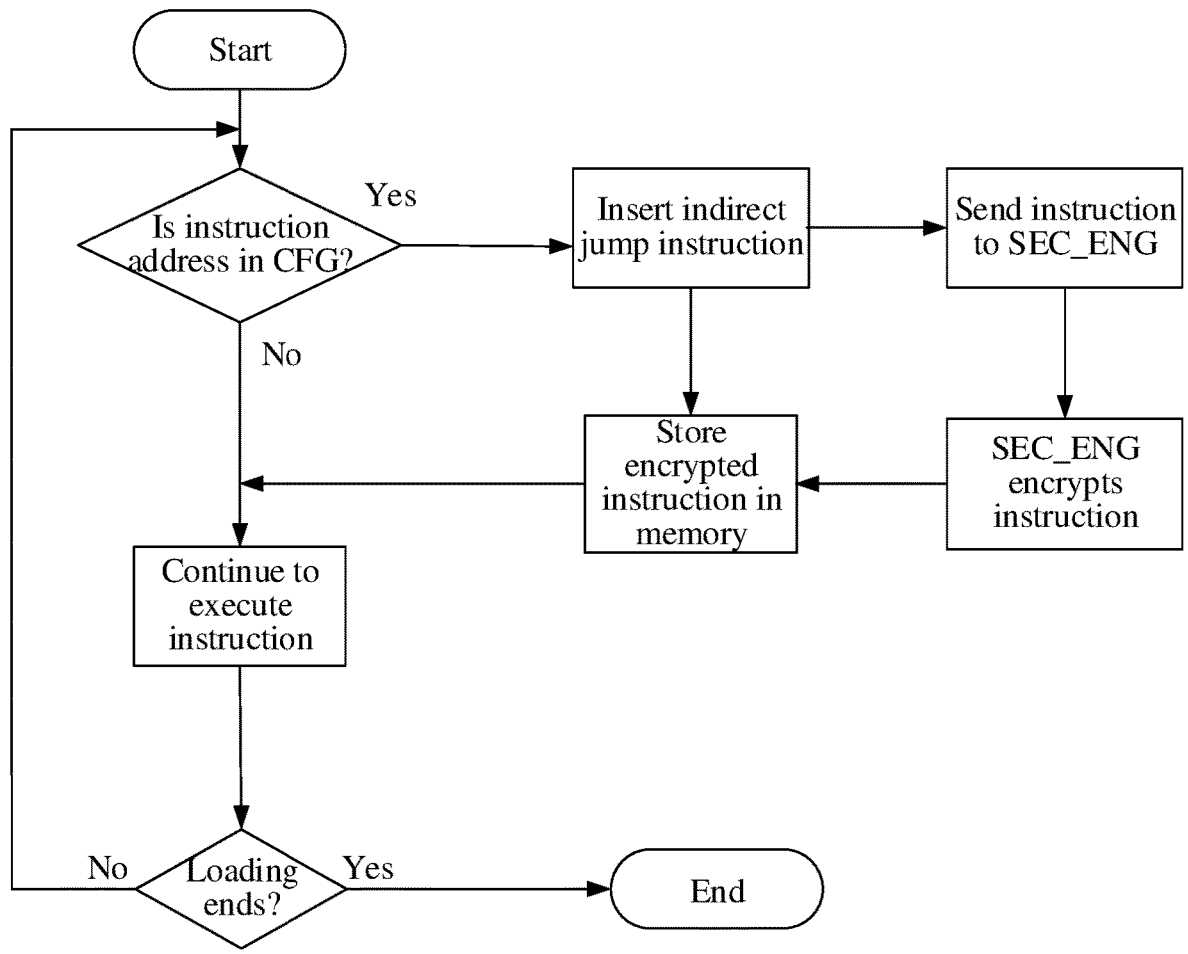
FIG. 7 is a schematic diagram of encrypting target instructions at an indirect jump destination address according to an embodiment of the present application.
Figure 8:
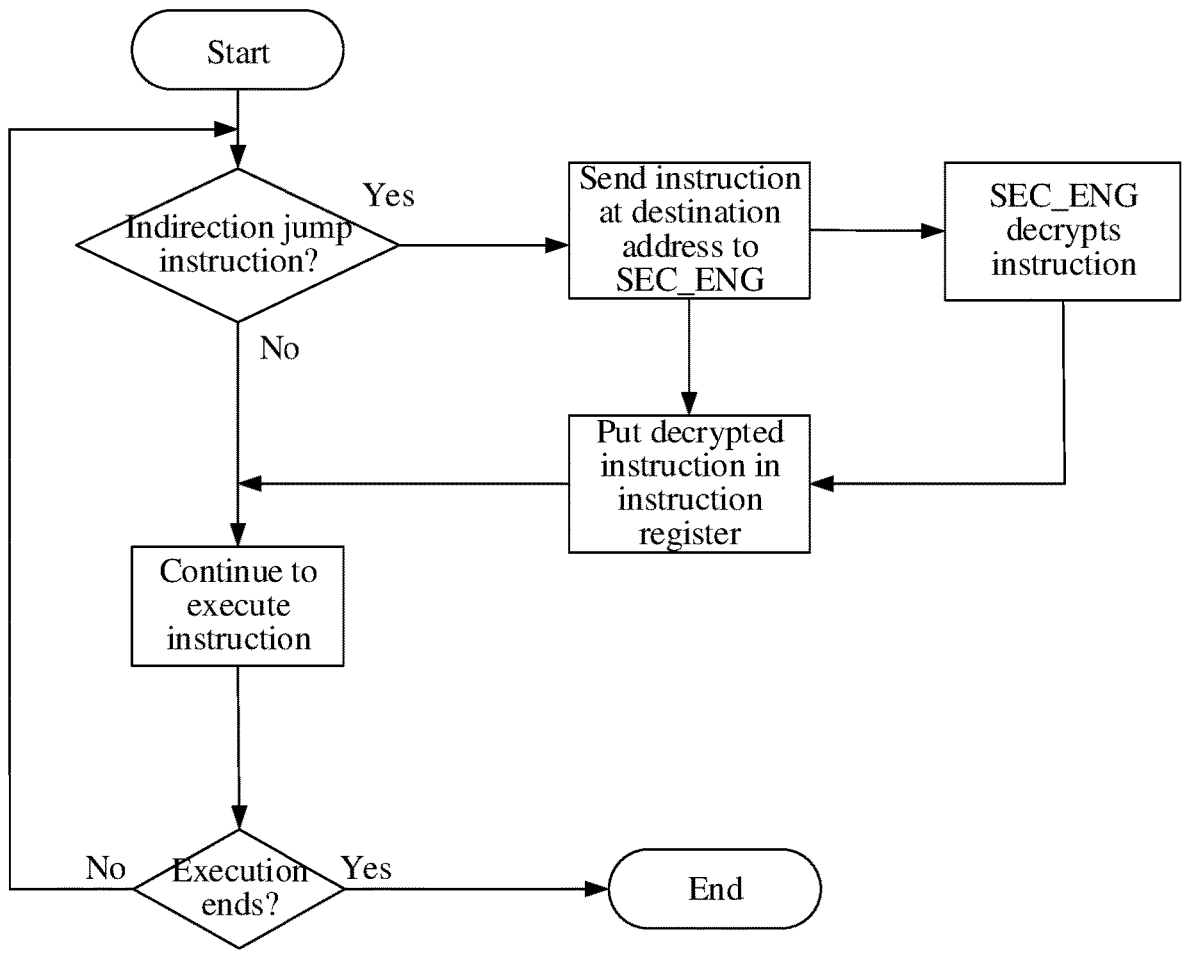
FIG. 8 is a schematic diagram of decrypting target instructions at the indirect jump destination address according to an embodiment of the present application.

The PUF protects the indirect jump by encrypting and decrypting the target instruction at the indirect jump instruction destination address. The specific process is shown in FIG. 7 and FIG. 8. When the program is loaded into memory, the hardware engine, i.e., SEC_ENG, encrypts the target instruction at the indirect jump destination address according to the key stored in the KEY_CTRL_FLOW_INFO and the encryption and decryption length stored in the LEN_CTRL_FLOW_INFO. When the processor is to execute the indirect jump instruction, the SEC_ENG decrypts the target instruction at the destination address with the same key and the same length.

As shown in FIG. 7, the hardware engine may encrypt the target instruction at the indirect jump destination address according to a CFG (Control Flow Graph). For example, determination may be made on whether the indirect jump destination address is in the CFG, and if so, the indirect jump instruction is inserted, and the target instruction at the destination address is sent to the hardware engine, so that the hardware engine encrypts the target instruction. The encrypted target instruction is loaded into the memory, and determination is made on whether the target instruction has been encrypted and loaded into the memory. If the target instruction has not been encrypted and loaded into the memory, the instruction is loaded until all contents of the target instruction are encrypted and loaded into the memory. If the destination address is not in the CFG, the loading of the instruction continues.

As shown in FIG. 8, during decryption, determination may be made on whether it is an indirect jump instruction; if so, the target instruction at the destination address is sent to the hardware engine SEC_ENG where it is decrypted, and the decrypted target instruction is sent to an instruction register; and the execution of the instruction continues until the execution ends.

It should be noted that the length of instructions in some ISAs is variable, for example, Intel x86 ISA. Therefore, the decryption result may not necessarily be exactly a complete instruction. In the present application, after the instruction is decrypted, the processor will decode the instruction, and then perform subsequent operations such as instruction fetch and memory access according to the decoding result. Since an instruction that has been loaded into memory will not be altered during execution, when the same indirect jump instruction is executed, the first LEN_CTRL_FLOW_INFO bits of the target instruction at its destination address remain encrypted. They may be decrypted simply.

If the attacker alters the destination address of the indirect jump instruction, after executing the indirect jump instruction, what the processor executes is the decrypted instruction at the altered destination address. When unencrypted instructions are decrypted and the decrypted instructions are executed, instruction errors or other errors may occur, thereby preventing and detecting illegal alter to the control flow. However, when the destination address is directly altered to another candidate jump destination address, since the target instructions at all candidate destination addresses have been encrypted when they are loaded, the program may still be executed normally, which may bring a potential attack. However, the instruction fragments available to the attacker are greatly restricted to each indirect jump destination address, which greatly increases the difficulty in implementing attack to a complete control flow in the target program.

As a special case, the target instructions at some indirect jump destination addresses may be executed sequentially without the jump of the previous instructions, for example, the first instruction in a do-while statement (the jump target instruction in the subsequent loop) is executed without being jumped in the first loop. In this case, without processing, an error will occur in the first loop, because the SEC_ENG will not decrypt these instructions without the triggering of the previous jump instructions. In order for these instructions to be decrypted normally when executed sequentially, the indirect jump instruction may be taken into consideration, which simply redirects the execution flow of the program to its subsequent instructions and is responsible for triggering the decryption operation at the target location.

S104: The program control flow is continued to be executed through the processor based on the decrypted target execution data.

When the target execution data is a function call return address, the process of continuing to execute the program control flow based on the decrypted target execution data by the processor may include: sending the decrypted function call return address to the register through the hardware engine; and controlling the program control flow to be jumped to the decrypted function call return address through the processor to continue to execute the program control flow.

When the target execution data is a target instruction at an indirect jump destination address, the process of continuing to execute the program control flow based on the decrypted target execution data by the processor may include: sending the decrypted target instruction to the register through the hardware engine, and executing the decrypted target instruction through the processor.

The method for defending against the control flow attack in the present application includes acquiring response data, which is output by the physical unclonable function PUF module to the input stimulus, and storing the response data in the register as key data to be used, thus, fully utilizes the characteristic that the PUF gives a unique response to each stimulus based on hardware characteristics, thereby obtaining the advantages of persistence and unpredictability, unclonability and tamper resistance. Furthermore, the method further includes: encrypting target execution data in a program control flow based on the key data in the process of the processor executing the program control flow, the target execution data including at least one of a target instruction at an indirect jump destination address and a function call return address; decrypting the encrypted target execution data when the processor is to execute the target execution data; and continuing to execute the program control flow based on the decrypted target execution data. The attacker is prevented from altering target execution data such as the target instruction at the indirect jump destination address and the function call return address in the program control flow. By encrypting and decrypting the function call return address and the instruction at the indirect jump destination address, the security of the processor is greatly enhanced to effectively defend against the control flow attack at the processor level.

Figure 9:
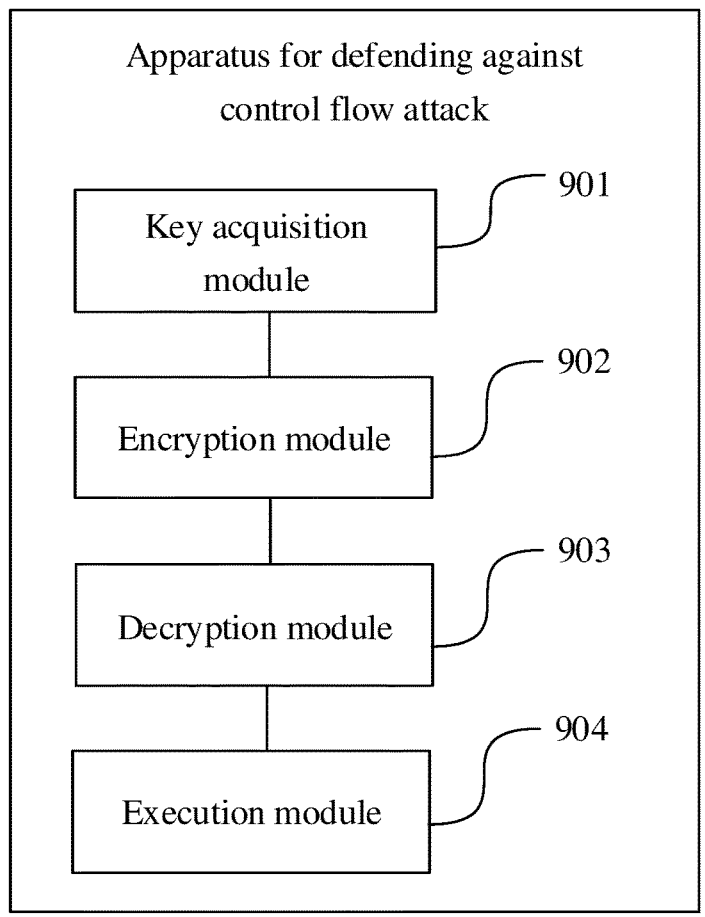
FIG. 9 is a schematic structure diagram of an apparatus for defending against control flow attack according to an embodiment of the present application.

FIG. 9 is a schematic structure diagram of an apparatus for defending against control flow attack according to an embodiment of the present application. As shown in FIG. 9, the apparatus includes a key acquisition module 901, an encryption module 902, a decryption module 903, and an execution module 904.

The key acquisition module 901 is configured to acquire response data, which is output by a physical unclonable function PUF module to an input stimulus, and store the response data in a register as key data to be used.

The encryption module 902 is configured to encrypt target execution data in a program control flow based on the key data in the process of the processor executing the program control flow, the target execution data including at least one of a target instruction at an indirect jump destination address and a function call return address.

The decryption module 903 is configured to decrypt the encrypted target execution data when the processor is to execute the target execution data.

The execution module 904 is configured to continue to execute the program control flow based on the decrypted target execution data.

In a possible implementation, the target execution data is a function call return address.

Correspondingly, the encryption module 902 is configured to, in the process of the processor executing the program control flow, read key data from the register through a hardware engine when the program control flow includes a function call instruction; encrypt the function call return address based on the key data, and push the encrypted function call return address into a program stack.

Correspondingly, the decryption module 903 is configured to fetch the encrypted function call return address from the program stack through the hardware engine when the execution of the called function by the function call instruction ends, and decrypt the fetched function call return address based on the key data.

In a possible implementation, the execution module is configured to send the decrypted function call return address to the register through the hardware engine; and control the program control flow to be jumped to the decrypted function call return address through the processor to continue to execute the program control flow.

In a possible implementation, the target execution data is a target instruction at an indirect jump destination address.

Correspondingly, the encryption module 902 is configured to, in the process of the processor executing the program control flow, read key data from the register through the hardware engine when the program control flow includes an indirect jump instruction; and in the process of loading the indirect jump instruction into the memory, encrypt the target instruction at the indirect jump destination address based on the key data through the hardware engine, and load the encrypted target instruction into the memory.

In a possible implementation, the encryption module 902 is configured to, in the process of loading the indirect jump instruction into the memory, encrypt the target instruction based on the key data and the encryption and decryption length obtained from the register.

Correspondingly, the decryption module 903 is configured to decrypt the encrypted target instruction based on the same encryption and decryption length and the same key data as the encryption process.

In a possible implementation, the execution module 904 is configured to send the decrypted target instruction to the register through the hardware engine, and execute the decrypted target instruction through the processor.

In a possible implementation, the key acquisition module 901 is configured to acquire response data, which is output by the PUF module to an input stimulus, when a memory security threshold of a target system does not exceed a target threshold, and store the response data in a first designated register as the key data to be used and store the encryption and decryption length in a second designated register; and when the memory security threshold of the target system exceeds the target threshold, obtain the key data based on an XOR encryption and decryption instruction sequence for protecting the key, and store the key data in a third designated register.

The apparatus for defending against control flow attack in the present application includes the key acquisition module, configured to acquire response data, which is output by the physical unclonable function PUF module to the input stimulus, and store the response data in the register as key data to be used, thus fully utilizes the characteristic that the PUF gives a unique response to each stimulus based on hardware characteristics, thereby obtaining the advantages of persistence and unpredictability, unclonability and tamper resistance. Furthermore, the apparatus further includes the encryption module, configured to encrypt target execution data in the program control flow based on the key data in the process of the processor executing the program control flow, the target execution data including at least one of the target instruction at the indirect jump destination address and the function call return address; the decryption module, configured to decrypt the encrypted target execution data when the processor is to execute the target execution data; and the execution module, configured to continue to execute the program control flow based on the decrypted target execution data. The attacker is prevented from altering the target execution data such as the target instruction at the indirect jump destination address and the function call return address in the program control flow. By encrypting and decrypting the function call return address and the instruction at the indirect jump destination address, the security of the processor is greatly enhanced to effectively defend against the control flow attack at the processor level.

It should be noted that, in embodiments of the present application, the key acquisition module, the encryption module, the decryption module, and the execution module included in the apparatus for defending against the control flow attack may also be referred to as the key acquisition circuit, the encryption circuit, the decryption circuit, and the execution circuit, which may be implemented with a circuit element or device, respectively. The key acquisition circuit, the encryption circuit, the decryption circuit, and the execution circuit may be included in the processor. That is, the apparatus for defending against the control flow attack may be a part of the processor.

In embodiments of the present application, the key acquisition module may be connected to the physical unclonable function PUF module and the register. The encryption module, the decryption module, and the execution module may be connected to the hardware engine, respectively.

The apparatus for defending against the control flow attack in this embodiment may execute the method for defending against the control flow attack shown in the foregoing embodiments of the present application. The implementation principle of the apparatus is similar, and details will not be described herein again.

Figure 10:
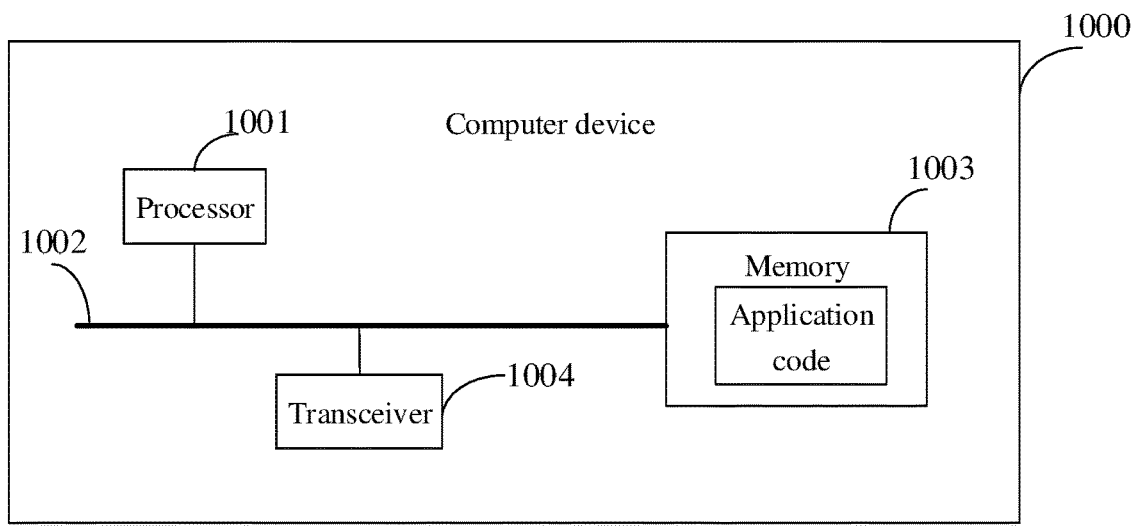
FIG. 10 is a schematic structure diagram of a computer device according to an embodiment of the present application.

FIG. 10 is a schematic structure diagram of a computer device according to an embodiment of the present application. As shown in FIG. 10, the computer device includes: a memory, a processor; and at least one program, stored in the memory, which, when executed by the processor, compared with the prior art, may allow the computer device realize the following beneficial effects.

The computer device in the present application acquires response data, which is output by a physical unclonable function PUF module to an input stimulus, and stores the response data in a register as key data to be used, thus fully utilizes the characteristic that the PUF gives a unique response to each stimulus based on hardware characteristics, thereby obtaining the advantages of persistence and unpredictability, unclonability and tamper resistance. Furthermore, the computer device in the present application encrypts target execution data in a program control flow based on the key data in the process of the processor executing the program control flow, the target execution data including at least one of a target instruction at an indirect jump destination address and a function call return address; decrypts the encrypted target execution data when the processor is to execute the target execution data; and continues to execute the program control flow based on the decrypted target execution data. The attacker are prevented from altering target execution data such as the target instruction at the indirect jump destination address and the function call return address in the program control flow. By encrypting and decrypting the function call return address and the instruction at the indirect jump destination address, the security of the processor is greatly enhanced to effectively defend against the control flow attack at the processor level.

In an optional embodiment, a computer device is provided. As shown in FIG. 10, the computer device 1000 shown in FIG. 10 includes a processor 1001 and a memory 1003. The processor 1001 is connected to the memory 1003, for example, through a bus 1002. Optionally, the computer device 1000 may further include a transceiver 1004. The transceiver 1004 may be used for data interaction between the computer device and other computer devices, for example, data transmission and/or data reception. It should be noted that, in practical applications, the transceiver 1004 is not limited to one, and the structure of the computer device 1000 does not constitute any limitations to the embodiments of the present application.

The processor 1001 may be a central processing unit (CPU), a general-purpose processor, a digital signal processor (DSP), an application specific integrated circuit (ASIC), or a field programmable gate array (FPGA), or other programmable logic device, a transistor logic device, a hardware component, or any combination thereof. The processor may implement or execute various exemplary logical blocks, modules and circuits described in connection with the present disclosure. The processor 1001 may also be a combination for realizing computing functions, for example, a combination of one or more microprocessors, a combination of a DSP and a microprocessor, etc.

The bus 1002 may include a path to transfer information between the components described above. The bus 1002 may be a peripheral component interconnect (PCI) bus, or an extended industry standard architecture (EISA) bus, etc. The bus 1002 may be an address bus, a data bus, a control bus, etc. For ease of presentation, the bus is represented by only one thick line in FIG. 10. However, it does not mean that there is only one bus or one type of buses.

The memory 1003 may be, but not limited to, a read only memory (ROM) or other type of static storage device that may store static information and instructions, a random access memory (RAM) or other type of dynamic storage device that may store information and instructions, may be an electrically erasable programmable read only memory (EEPROM), a compact disc read only memory (CD-ROM) or other optical disk storage, an optical disc storage (including a compact disc, a laser disc, a disc, a digital versatile disc, a blue-ray disc, etc.), a magnetic storage media or other magnetic storage device, or any other media that may carry or store desired program codes in the form of instructions or data structures and that may be accessed by a computer.

The memory 1003 is used to store application program codes (computer programs) for executing the solutions of the present application, which is controlled by the processor 1001. The processor 1001 is used to execute the application program codes stored in the memory 1003 to implement the content shown in the foregoing method embodiments.

The computer device includes, but is not limited to, any electronic device such as a computer device, a terminal, and a server.

An embodiment of the present application provides a processor including the apparatus for defending against the control flow attack as described above.

An embodiment of the present application provides a computer-readable storage medium having computer programs stored thereon that, when being run on a computer, enable the computer to implement corresponding contents of the method for defending against the control flow attack.

An embodiment of the present application provides a computer program product or computer program including computer instructions that are stored in a computer-readable storage medium. The processor of the computer device reads the computer instructions from the computer-readable storage medium, and executes the computer instructions so that the computer device executes the method for defending against the control flow attack.

It should be understood that although the steps in the flowchart shown in the drawings are sequentially displayed by following the arrows, these steps are not necessarily performed in the order indicated by the arrows. Unless explicitly stated herein, the execution order of these steps is not strictly limited, and they may be performed in other orders. Moreover, at least some of the steps in the flowchart shown in the drawings may include multiple sub-steps or multiple stages. These sub-steps or stages are not necessarily performed at the same moment of time, and instead, may be performed at different moments of time. The sub-steps or stages are not necessarily performed sequentially, and instead, may be performed in turn or alternately with other steps or at least some of the sub-steps or stages of other steps.

What described above are some implementations of the present invention. It should be noted that, for a person of ordinary skill in the art, a number of improvements and modifications may be made without departing from the principle of the present invention, and those improvements and modifications shall also be regarded as falling into the protection scope of the present invention.

What is claimed is:

1. An apparatus for defending against control flow attack, comprising:
    a key acquisition circuit, configured to acquire response data, which is output by a physical unclonable function unit to an input stimulus, and store the response data in a register as key data to be used, the physical unclonable function unit gives a unique response to each stimulus based on hardware characteristics;
    an encryption circuit, configured to encrypt target execution data in a program control flow based on the key data in the process of a processor executing the program control flow, the target execution data comprising at least one of a target instruction at an indirect jump destination address and a function call return address;
    a decryption circuit, configured to decrypt the encrypted target execution data when the processor is to execute the target execution data; and
    an execution circuit, configured to continue to execute the program control flow based on the decrypted target execution data, wherein the encryption circuit is further configured to, when the target execution data comprises the target instruction at the indirect jump destination address, in the process of the processor executing the program control flow, read the key data from the register through the hardware engine when the program control flow comprises an indirect jump instruction; and
    in the process of loading the indirect jump instruction into the memory, encrypt the target instruction at the indirect jump destination address based on the key data through the hardware engine, and load the encrypted target instruction into the memory.

2. The apparatus for defending against control flow attack according to claim 1, wherein the target execution data is a function call return address;
    the encryption circuit is further configured to, in the process of the processor executing the program control flow, read the key data from the register through a hardware engine when the program control flow comprises a function call instruction; encrypt the function call return address based on the key data, and push the encrypted function call return address into a program stack; and
    the decryption circuit is further configured to fetch the encrypted function call return address from the program stack through the hardware engine when the execution of the called function by the function call instruction ends, and decrypt the fetched function call return address based on the key data.

3. The apparatus for defending against control flow attack according to claim 2, wherein
    the execution circuit is further configured to send the decrypted function call return address to the register through the hardware engine; and control the program control flow to be jumped to the decrypted function call return address through the processor to continue to execute the program control flow.

4. The apparatus for defending against control flow attack according to claim 1, wherein
    the encryption circuit is further configured to perform the following encryption process on the target instruction through the hardware engine: in the process of loading the indirect jump instruction into the memory, encrypt the target instruction based on the key data and information on encryption and decryption length obtained from the register; and the decryption circuit is further configured to perform the following decryption process on the encrypted target instruction through the hardware engine: decrypt the encrypted target instruction based on the same information on encryption and decryption length and the same key data as the encryption process.

5. The apparatus for defending against control flow attack according to claim 1, wherein
the execution circuit is further configured to send the decrypted target instruction to the register through the hardware engine, and execute the decrypted target instruction through the processor.

6. The apparatus for defending against control flow attack according to claim 1, wherein
the key acquisition circuit is further configured to acquire the response data, which is output by the physical unclonable function unit to the input stimulus, when a memory security threshold of a target system does not exceed a target threshold, and store the response data in a first designated register of the register as the key data to be used and store information on encryption and decryption length in a second designated register of the register; and when the memory security threshold of the target system exceeds the target threshold, obtain the key data based on an XOR encryption and decryption instruction sequence, and store the key data in a third designated register of the register.

7. A method for defending against control flow attack, comprising:
acquiring response data, which is output by a physical unclonable function unit to an input stimulus, and storing the response data in a register as key data to be used, the physical unclonable function unit gives a unique response to each stimulus based on hardware characteristics;
encrypting target execution data in a program control flow based on the key data in the process of a processor executing the program control flow, the target execution data comprising at least one of a target instruction at an indirect jump destination address and a function call return address;
decrypting the encrypted target execution data when the processor is to execute the target execution data; and
continuing to execute the program control flow based on the decrypted target execution data,
when the target execution data comprises the target instruction at the indirect jump destination address, the encrypting the target execution data in the program control flow based on the key data comprises: in the process of the processor executing the program control flow, reading the key data from the register through a hardware engine when the program control flow comprises an indirect jump instruction; and in the process of loading the indirect jump instruction into the memory, encrypting the target instruction at the indirect jump destination address based on the key data through the hardware engine, and loading the encrypted target instruction into the memory.

8. The method for defending against control flow attack according to claim 7, wherein the target execution data is a function call return address;
the encrypting the target execution data in the program control flow based on the key data in the process of the processor executing the program control flow comprises:
in the process of the processor executing the program control flow, reading the key data from the register through a hardware engine when the program control flow comprises a function call instruction; and
encrypting the function call return address based on the key data, and pushing the encrypted function call return address into a program stack;
the decrypting the encrypted target execution data when the processor is to execute the target execution data comprises:
fetching the encrypted function call return address from the program stack through the hardware engine when the execution of the called function by the function call instruction ends, and decrypting the fetched function call return address based on the key data.

9. The method for defending against control flow attack according to claim 8, wherein the continuing to execute the program control flow based on the decrypted target execution data comprises:
sending the decrypted function call return address to the register through the hardware engine; and
controlling the program control flow to be jumped to the decrypted function call return address through the processor to continue to execute the program control flow.

10. The method for defending against control flow attack according to claim 8, wherein the encrypting the target instruction at the indirect jump destination address based on the key data through the hardware engine comprises:
performing the following encryption process on the target instruction through the hardware engine:
in the process of loading the indirect jump instruction into the memory, encrypting the target instruction based on the key data and information on encryption and decryption length obtained from the register; and
the decrypting the encrypted target execution data comprises:
performing the following decryption process on the encrypted target instruction through the hardware engine:
decrypting the encrypted target instruction based on the same information on encryption and decryption length and the same key data as the encryption process.

11. The method for defending against control flow attack according to claim 7, wherein the continuing to execute the program control flow based on the decrypted target execution data comprises:
sending the decrypted target instruction to the register through the hardware engine, and executing the decrypted target instruction through the processor.

12. The method for defending against control flow attack according to claim 7, wherein the acquiring the response data, which is output by the physical unclonable function unit to the input stimulus, and storing the response data in the register as the key data to be used comprise:
acquiring the response data, which is output by the physical unclonable function unit to the input stimulus, when a memory security threshold of a target system does not exceed a target threshold, and storing the response data in a first designated register as the key data to be used and storing information on encryption and decryption length in a second designated register; and when the memory security threshold of the target system exceeds the target threshold, obtaining the key data based on an XOR encryption and decryption instruction sequence, and storing the key data in a third designated register.

\* \* \* \* \*